(No Model.)
C. GUNSEL.
CURTAIN FIXTURE.
No. 443,091. Patented Dec. 23, 1890.
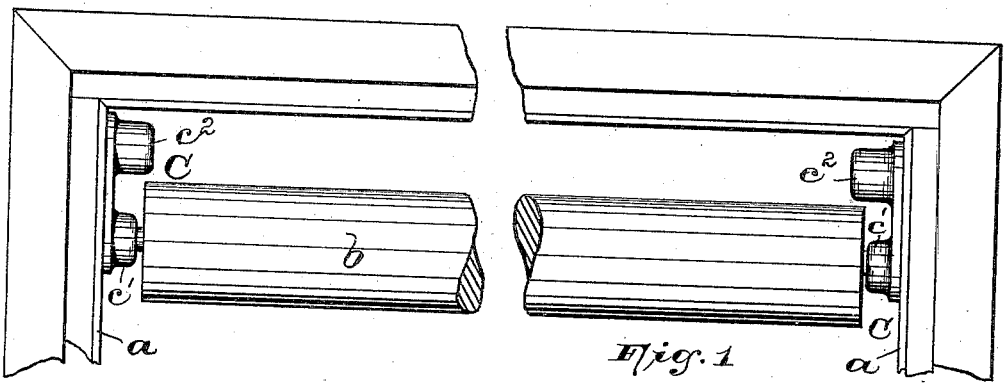
Fig. 1
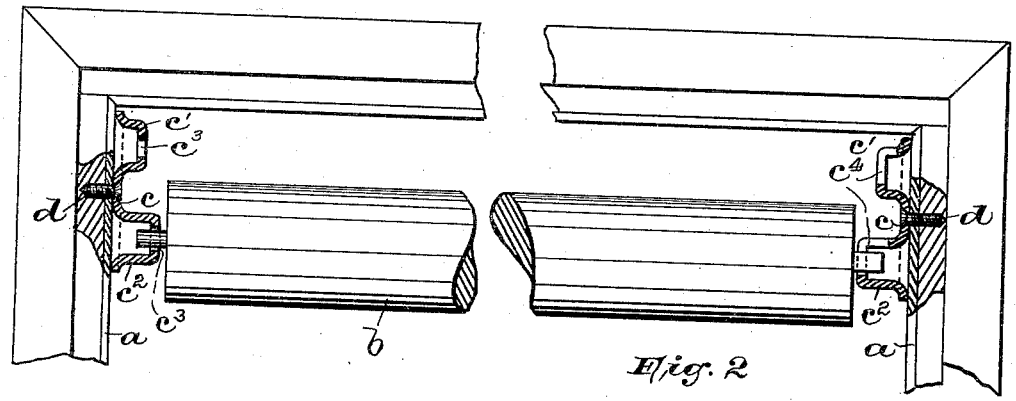
Fig. 2
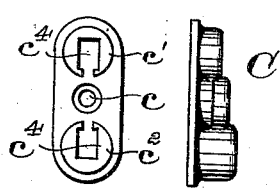  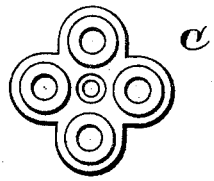 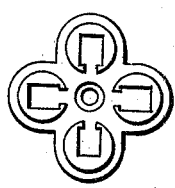
Fig. 3   Fig. 4   Fig. 5   Fig. 6   Fig. 7
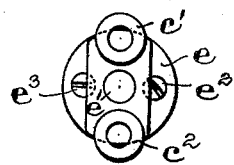 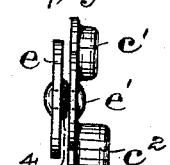
Fig. 8   Fig. 9
WITNESSES:
Wm. H. Canfield, Jr.
F. A. Phelps, Jr.
INVENTOR
Charles Gunsel,
BY Fred'k C. Fraentzel, ATT'Y.

UNITED STATES PATENT OFFICE.

CHARLES GUNSEL, OF NEWARK, NEW JERSEY.

CURTAIN-FIXTURE.

SPECIFICATION forming part of Letters Patent No. 443,091, dated December 23, 1890.

Application filed September 19, 1890. Serial No. 365,488. (No model.)

*To all whom it may concern:*

Be it known that I, CHARLES GUNSEL, a citizen of the United States, residing at Newark, in the county of Essex and State of New Jersey, have invented certain new and useful Improvements in Curtain-Fixtures; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to that class of fastenings or brackets for the supporting of window-shade rollers in which the bearings of the shade-roller are secured to the inside stop-bead; and it consists in the improved construction and combination of parts of such a device in which the fastenings or brackets rotate upon pivotal pins, and are thereby capable of being adjusted to different lengths of shade-rollers, and in which the bearings can be adjusted to the length of the shade-roller to suit the construction of the window-frame, as will be hereinafter more fully described and claimed.

In the drawings herewith accompanying, Figure 1 is a front view of the upper portion of a window-frame provided with my fastenings adapted to rotate upon a pivotal pin and provided with two bearings of different sizes in length, illustrating a shade-roller in position in one of the bearings in each fastener. Fig. 2 is a similar view, the fasteners or brackets being represented in section, each having been rotated on its pivotal pin, whereby the positions of the bearings are reversed from those shown in Fig. 1 to suit a shorter shade-roller. Figs. 3 and 4 are front views of my improved fasteners. Figs. 5, 6, and 7 are views of a modified form of construction, in which four bearings are shown instead of two, as in the previous figures. Figs. 8 and 9 are a front and side view, respectively, of still another form of construction, in which the bearing-plate is pivotally secured to a back plate.

Similar letters of reference are employed to indicate corresponding parts in each of the several views.

In said drawings, $a$ indicates the inside stop-bead of the window-frame.

$b$ is the shade-roller, and C my pivoted bearing-plates or fasteners provided with two or more bearings for the reception of the trunnions of the roller.

The bearing-plates or fasteners, as shown in Figs. 1, 2, 3, *et seq.*, are secured to the inner sides of the stop-beads $a$ by means of a pin or screw $d$ passing through a centrally-arranged perforation or hole $c$. On the inner side of one bead I have secured the fastener represented in Fig. 3, while the fastener illustrated in Fig. 4 is secured to the opposite stop-bead.

The fasteners C are provided with two bearings $c'$ and $c^2$, respectively, having the perforations $c^3$ in one fastener and the slots $c^4$ in the other. It will be seen from Fig. 1 that these bearings are of different lengths, the bearings $c'$ being shorter. From said figure it will be evident that when the fasteners have been secured in their respective positions on the stop-beads the shade-roller is placed within the lower bearings, as illustrated. Now, if it is found that the shade-roller is too short in length to fit the bearings $c'$, the fasteners C are rotated upon their pivotal pins $d$, so that bearing $c^2$ assumes the position just occupied by the bearing $c'$, which is clearly shown in Fig. 2. In this manner the device is capable of being adjusted to rollers varying in length. The fasteners are also of great advantage in windows which vary slightly in width, thus enabling a person to put up the same roller at a wide or narrow window without going to the trouble of cutting or fitting the shade-roller.

From Fig. 4 it will be seen that the slots $c^4$ extend toward each other, so that the slot in the lower bearing will at all times extend upwardly.

Instead of providing the fasteners C with two bearings of different lengths, I can provide them with four or more bearings, as shown in Figs. 5, 6, and 7, in which, when applied to the beads of a window-frame, the distance between the two opposite shortest bearings and the two longest bearings can be made to vary over one-half inch by bringing the bearings into the different positions, as above stated.

In Figs. 8 and 9 I have represented my improved fastener or bearing-plate C secured to a body-plate $e$ by means of a pin or rivet $e'$. The plate $e$, which may be of any suitable shape, is attached to the stop-bead by the screws $e^2$ and $e^3$, and the bearing-plate rotates on a shoulder $e^4$ on the plate $e$.

The several advantages of the above-described forms of brackets are evident. The trouble heretofore has been that in the ordinary form of fasteners when secured to the inner sides of the stop-beads the shade-roller had to be exactly fitted and cut in the proper length, otherwise the slightest jar in closing the window would throw the roller out of its supporting-bearings. In my form of construction, however, if the roller has been cut too short, or if the window-frame is too wide, any one of the bearings on the plate C can be rotated into its proper position and the roller placed between the two fasteners without any danger of its dropping therefrom when jarred.

Having thus described my invention, what I claim is—

1. The combination, with the inner and opposite sides of a window-frame or the stop-beads thereof, of shade-roller fasteners provided with two or more bearings of different lengths, for the purposes set forth.

2. The combination, with the inner and opposite sides or stop-beads of a window-frame, of shade-roller fasteners secured by means of a pivotal pin and adapted to rotate thereon and provided with two or more bearings of different lengths, for the purposes set forth.

3. A shade-roller fastener consisting of a perforated bearing-plate provided with two or more bearings of different lengths, as and for the purposes set forth.

4. A shade-roller fastener consisting of a centrally-perforated body portion or bearing-plate provided with two or more bearings of different lengths, each bearing being provided with a slot extending toward the central perforation in the body-plate, as and for the purposes set forth.

5. A shade-roller fastener consisting of a body or bearing plate C, provided with two or more bearings of different lengths and pivotally secured to a back plate $e$, as and for the purposes set forth.

6. The combination, with the inner sides or stop-beads of a window-frame, of shade-roller fasteners C, secured to a back plate $e$ by means of a pivotal pin or screw $d$, and each bearing-plate being provided with two or more bearings of different lengths, for the purposes set forth.

In testimony that I claim the invention set forth above I have hereunto set my hand this 15th day of September, 1890.

CHARLES GUNSEL.

Witnesses:
 FREDK. C. FRAENTZEL,
 WM. H. CAMFIELD, Jr.